United States Patent
Sour et al.

(10) Patent No.: US 9,266,281 B2
(45) Date of Patent: *Feb. 23, 2016

(54) PROCESS FOR WELDING OF TWO POLYAMIDE PARTS

(71) Applicant: DSM IP ASSETS B.V., Heerlen (NL)

(72) Inventors: Wilhelmus Josephus Maria Sour, Maastricht (NL); Antonius Maria Vet, Sittard (NL)

(73) Assignee: DSM IP ASSETS B.V., Heerlen (NL)

( * ) Notice: Subject to any disclaimer, the term of this patent is extended or adjusted under 35 U.S.C. 154(b) by 0 days.

This patent is subject to a terminal disclaimer.

(21) Appl. No.: 13/898,188

(22) Filed: May 20, 2013

(65) Prior Publication Data

US 2013/0251448 A1    Sep. 26, 2013

Related U.S. Application Data

(63) Continuation of application No. 12/528,966, filed on Nov. 11, 2009, and application No. PCT/EP2008/001894, Mar. 10, 2008, now Pat. No. 8,465,609.

(30) Foreign Application Priority Data

Mar. 15, 2007  (EP) ..................................... 07005380

(51) Int. Cl.
| | |
|---|---|
| *B32B 37/00* | (2006.01) |
| *B29C 65/06* | (2006.01) |
| *B29C 65/18* | (2006.01) |
| *C08J 5/12* | (2006.01) |
| *C09J 5/00* | (2006.01) |
| *B29C 65/04* | (2006.01) |
| *B29C 65/08* | (2006.01) |
| *B29C 65/16* | (2006.01) |
| *B29C 65/20* | (2006.01) |
| *B29C 65/00* | (2006.01) |
| *B29K 105/00* | (2006.01) |
| *B29K 305/12* | (2006.01) |

(52) U.S. Cl.
CPC ................. *B29C 65/06* (2013.01); *B29C 65/18* (2013.01); *B29C 66/71* (2013.01); *B29C 66/73921* (2013.01); *C08J 5/12* (2013.01); *C09J 5/00* (2013.01); *B29C 65/04* (2013.01); *B29C 65/08* (2013.01); *B29C 65/16* (2013.01); *B29C 65/20* (2013.01); *B29C 66/43441* (2013.01); *B29C 66/7212* (2013.01); *B29K 2105/0005* (2013.01); *B29K 2105/005* (2013.01); *B29K 2105/0044* (2013.01); *B29K 2305/12* (2013.01); *B29K 2995/004* (2013.01); *B29K 2995/0039* (2013.01); *C08J 2377/00* (2013.01); *C09J 2477/006* (2013.01); *Y10T 156/10* (2015.01); *Y10T 403/477* (2015.01); *Y10T 428/1352* (2015.01); *Y10T 428/1393* (2015.01); *Y10T 428/31728* (2015.04)

(58) Field of Classification Search
USPC ............. 156/73.5, 308.2, 308.4, 309.6, 309.9
See application file for complete search history.

(56) References Cited

U.S. PATENT DOCUMENTS

| | | | |
|---|---|---|---|
| 4,280,935 A | 7/1981 | Ogiwara | |
| 4,610,808 A | 9/1986 | Kleiner | |
| 4,891,399 A | 1/1990 | Ohkawa et al. | |
| 5,071,894 A | 12/1991 | Weil et al. | |
| 5,280,053 A | 1/1994 | Dearlove et al. | |
| 5,604,285 A | 2/1997 | Miyamori et al. | |
| 8,465,609 B2 * | 6/2013 | Sour et al. ................... | 156/73.5 |
| 2004/0157023 A1 | 8/2004 | Magalhaes et al. | |

FOREIGN PATENT DOCUMENTS

| | | |
|---|---|---|
| EP | 1 498 445 | 1/2005 |
| EP | 1 498 445 A1 * | 1/2005 |
| JP | 63-3430 | 1/1988 |
| JP | A-2189347 | 7/1990 |
| JP | A-7276465 | 10/1995 |
| JP | A-09/221590 | 8/1997 |
| JP | A-2000/86889 | 3/2000 |
| JP | A-2002/69220 | 3/2002 |
| WO | WO 02/090425 | 11/2002 |
| WO | WO 2007/012660 | 2/2007 |
| WO | WO 2007/042368 | 4/2007 |

OTHER PUBLICATIONS

International Search Report for PCT/EP2008/001894, mailed Jul. 15, 2008.
Database WPI Week 199145; Accession No. 1991-330684 & NL 9 000 714 (Oct. 16, 1991), Abstract.

* cited by examiner

*Primary Examiner* — James Sells
(74) *Attorney, Agent, or Firm* — Nixon & Vanderhye P.C.

(57) ABSTRACT

Plastic bodies are formed of two polyamide parts welded together, wherein the two polyamide parts consist of a polyamide composition at least one which comprises an iron containing additive. The welding process for making the plastic body includes welding two polyamide parts, at least one of which consists of a polyamide composition comprising an iron containing additive.

12 Claims, No Drawings

PROCESS FOR WELDING OF TWO POLYAMIDE PARTS

This application is a continuation of commonly owned U.S. application Ser. No. 12/528,966, filed Nov. 11, 2009 (now U.S. Pat. No. 8,465,609), which is the national phase application of International Application PCT/EP2008/001894, filed Mar. 10, 2008, which designated the US and claims benefit of EP Patent Application No. 07005380.6, filed Mar. 15, 2007, the entire contents of each of which are hereby incorporated by reference.

The invention relates to a process for welding of two polyamide parts both made of a polyamide composition comprising a polyamide and optionally additives. The invention further relates to a welded plastic body obtainable by the process and comprising two polyamide parts welded together.

Such a process and such a plastic body comprising two polyamide parts welded together are known from EP-1383825-A1. In EP-1383825-A1 it is described that two polyamide parts can be welded together by vibration welding.

It is known in the art to manufacture moulded articles from polyamide containing resin compositions. Sometimes the requirements for the geometric shape of the moulded articles exceed the technical capabilities for moulding such an article in one piece or the moulding can only be carried out using a relatively costly and slow lost-core moulding process. As a result, alternative manufacturing processes have been developed to enable relatively complex-formed articles to be produced by first moulding parts of the article, for instance two halve shells of a hollow article, and in a second step welding the shells together to form the desired article.

Difficulties have sometimes been encountered, however, in manufacturing articles with sufficient strength to withstand the forces encountered in the utilization of such welded articles. A general problem with plastic bodies comprising two polyamide parts welded parts welded together is that the strength of the weld-line is typically much lower than that of the bulk of the two polyamide parts. When such welded plastic bodies are subjected to mechanical tests, failure occurs at the weld line. In particular, weld failure can be a problem in applications where the welded article is subjected to an elevated pressure. A typical example is with air inlet manifolds for the automotive industry. This can happen, for example, when the article is an air intake manifold on an internal combustion engine, and the engine backfires.

A typical approach to solve the problem of the weld strength is to increase the wall thickness of the parts at the periphery where the weld lines are foreseen. Such an increase in wall thickness is not always possible or desirable for other technical reasons.

A further problem related to weld failure is that in many cases the addition of compounds to the thermoplastic resin composition intended to increase the strength of a weld in the final article, can lead instead to a decrease in some other important property of the moulded article. In particular with mineral filled and glass fibre filled compositions, the difference between bulk strength and weld strength is significant and moreover the weld strength is often adversely affected when the amount of filler or glass fibres is further increased.

EP-1383825-A1 also deals with the problem of insufficient strength of the plastic body comprising the two welded polyamide parts. To increase the weld strength of the plastic body with the two welded parts EP-1383825-A1 provides a process wherein the two polyamide parts are made from different polyamide compositions: the first part is made of a polyamide composition comprising a polyamide having a lower softening point than the polyamide in the polyamide composition of the second part and the polyamide composition of the first part further comprises one or more viscosity increasing additives.

Another solution for the same problem is provided by WO98/11164. WO98//11164 describes a welding process wherein a specific plasticizing compound is included in the polyamide resin composition from which the two polyamide parts are made. The polyamide component in the two polyamide parts is the same.

A problem with the solution of EP-1383825-A1 as well as WO98/11164 is that the use of plasticizers and polyamide having a lower softening point reduce the stiffness of welded plastic body and limits the use at elevated temperature.

A further problem of plastic bodies made from two welded polyamide parts is that the weld strength not only is much lower than that of the bulk of the two parts but also deteriorates much faster than that of the bulk of the two parts.

The aim of the invention is therefore to provide a process for welding of two polyamide parts which results in welded plastic bodies showing improved performance in weld-strength and/or retention thereof at elevated temperature.

This aim has been achieved with the process according to the invention, wherein at least one of the two polyamide parts consists of a polyamide composition comprising an iron containing additive.

The effect of the iron containing additive comprised by the polyamide composition of which at least one of the two polyamide parts consists in the welding process according to the invention is that the welding results in welded plastic bodies that show a higher weld-strength and/or a better retention thereof at elevated temperature, compared to corresponding welded plastic bodies obtained from a corresponding welding process wherein neither of the two polyamide parts comprises an iron containing additive in its composition.

In the process according to the invention, the two parts may suitably consist of the same polyamide composition, as well as of different polyamide compositions. The different polyamide compositions may be different in that one composition comprises the iron containing additive, and or in that the compositions comprise different polyamides and/or different further additives.

In a preferred mode of the process according to the invention, both of the two parts consist of a polyamide composition comprising the iron containing additive. The advantage thereof is that that the weld strength of the welded plastic body is further increased and better retained at elevated temperature.

The iron containing additive may comprise iron as the single metal element, or may comprise further metal elements. Thus the additive may comprise a iron content making up for the total content of metal elements or the iron content may be part of a large amount of the total metal content. Given the beneficial effects of the present invention may be related to the iron content of the additive, the iron containing additive preferably has an iron content relative to the total weight of metal content of the iron containing additive of at least 75 wt. %, more preferably at least 85 wt. % and even more preferably at least 95 wt. %.

Suitably, the iron containing additive comprises iron in elementary form, i.e. elementary iron, and/or an iron oxide and/or salt thereof. Preferably, the iron containing additive comprises at least 60 wt. % and more preferably 75 wt. % elemental iron, relative to the total non-polymeric wt. % of the iron containing additive.

Typically such a material has a particle size distribution with the majority of the particles having a particle size of for example, of at most 2 mm. In general, the elementary metal has a weight average particle size (dm) of at most 1 mm.

Preferably, the elementary iron comprised by the iron containing additive is finely dispersed in the polyamide composition. The finely dispersed elementary iron may consist of particles having a particle size varying over a large range. Preferably the finely dispersed elementary iron has a weight average particle size of at most 500 µm, more preferably at most 300 µm, 200 µm, or even 100 µm, and still more preferably at most 50 µm. The elementary iron may have a very small particle size with a weight average particle size of, for example, 10 or 5 µm and even lower. The advantage of a lower weight average particle size of the elementary iron is that the weld strength properties are even further improved.

The weight average particle size is determined as $D_m$ according to ASTM standard D1921-89, method A.

Suitable elementary iron, that can be comprised by the polyamide parts used in the process according to the invention, is, for example, SCM Iron Powder A-131, available form SMC Metal Products, Ohio.

Suitably the iron containing additive comprising an iron oxide and/or salt thereof, comprises iron (II) oxide [FeO], iron (III) oxide [Fe2O3] and/or a combination [Fe3O4] thereof, a ferrite, an iron phosphorus oxide and/or a mixture thereof.

The iron oxide and/or salt thereof may consist of particles having a particle size varying over a large range. Preferably the iron oxide and/or salt thereof consists of particles having a weight average particle size of at most 1 mm, preferably at most 0.5 mm, more preferably at most 0.1 mm, and still more preferably at most 50 µm.

For reasons of cost effectiveness, the iron containing additive, and particularly elemental iron, preferably has a weight average particle size of more than 1 µm, more preferably more than 2 µm and even more preferably more than 3 µm. Finer grades of additive generally result in increased raw material and compounding costs which are generally not transferred in the a corresponding increase in performance. Further, finely ground elemental iron also represents an explosive hazard.

The iron containing additive may be present in an amount varying over a large range. Very small amounts already do have an effect on the weld strength properties, which effect increases with increasing amount of the iron containing additive. At high amounts this effect levels off. Preferably the iron containing additive is present in an amount of 0.01-10 wt. %, more preferably 0.05-4 wt. %, and still more preferably 0.1-2 wt. %, and relative to the total weight of the polyamide composition. A higher amount has the advantage that the weld line properties are further increased.

The polyamide polymer in the polyamide composition containing the iron containing additive may be any polyamide polymer suitable for making polyamide parts and production of welded plastic bodies therefrom.

Suitably, the polyamide polymer is a thermoplastic polyamide, an amorphous or semi-crystalline polyamide, as well as an aliphatic or a semi-aromatic polyamide.

Suitable aliphatic polyamides are, for example, PA-6, PA-11, PA-12, PA-4,6, PA-4,8, PA-4,10, PA-4,12, PA-6,6, PA-6,9, PA-6,10, PA-6,12, PA-10,10, PA-12,12, PA-6/6,6-copolyamide, PA-6/12-copolyamide, PA-6/11-copolyamide, PA-6,6/11-copolyamide, PA-6,6/12-copolyamide, PA-6/6,10-copolyamide, PA-6,6/6,10-copolyamide, PA-4,6/6-copolyamide, PA-6/6,6/6,10-terpolyamide, and copolyamides obtained from 1,4-cyclohexanedicarboxylic acid and 2,2,4- and 2,4,4-trimethylhexamethylenediamine, and copolyamides of the aforementioned polyamides.

Suitable semi-aromatic polyamides are, for example, PA-6,I, PA-6,I/6,6-copolyamide, PA-6,T, PA-6,T/6-copolyamide, PA-6,T/6,6-copolyamide, PA-6,I/6,T-copolyamide, PA-6,6/6,T/6,I-copolyamide, PA-6,T/2-MPMD,T-copolyamide (2-MPMD=2-methylpentamethylene diamine), PA-9,T, PA-9T/2-MOMD,T (2-MOMD=2-methyl-1,8-octamethylenediamine), copolyamides obtained from terephthalic acid, 2,2,4- and 2,4,4-trimethylhexamethylenediamine, copolyamide obtained from isophthalic acid, laurinlactam and 3,5-dimethyl-4,4-diamino-dicyclohexylmethane, copolyamides obtained from isophthalic acid, azelaic acid and/or sebacic acid and 4,4-diaminodicyclo-hexylmethane, copolyamides obtained from caprolactam, isophthalic acid and/or terephthalic acid and 4,4-diaminodicyclohexyl-methane, copolyamides obtained from caprolactam, isophthalic acid and/or terephthalic acid and isophoronediamine, copolyamides obtained from isophthalic acid and/or terephthalic acid and/or other aromatic or aliphatic dicarboxylic acids, optionally alkyl-substituted hexamethylenediamine and alkyl-substituted 4,4-diaminodicyclohexylamine, and copolyamides of the aforementioned polyamides.

Preferably polyamides are chosen from the group consisting of PA-6, PA-6,6, PA-6,10, PA-4,6, PA-11, PA-12, PA-12,12, PA-6,I, PA-6,T, PA-6,I/6,T-copolyamide, PA-6,T/6,6-copolyamide, PA-6,T/6-copolyamide, PA-6/6,6-copolyamide, PA-6,6/6,T/6,I-copolyamide, PA-6,T/2-MPMD,T-copolyamide, PA-9,T, PA-9T/2-MOMD,T-copolyamide, PA-4,6/6-copolyamide and mixtures and copolyamides of the aforementioned polyamides. More preferably PA-6,I, PA-6,T, PA-6,I/6,T-copolyamide, PA-6,6, PA-6,6/6T, PA-6,6/6,T/6,I-copolyamide, PA-6,T/2-MPMD,T-copolyamide, PA-9,T, PA-9T/2-MOMD,T-copolyamide or PA-4,6, or a mixture or copolyamide thereof, is chosen as the polyamide.

Preferably, the polyamide polymer is an amorphous polyamide having a glass transition temperature (Tg) or semi-crystalline polyamide having a melting temperature (Tm), wherein the said temperature, being either the Tg of the amorphous polyamide or the Tm of the semi-crystalline polyamide, is at least 200° C., more preferably at least 220° C., 250° C., 270° C., 280° C., or even at least 290° C.

With the term melting temperature is herein understood the melting temperature measured by DSC with a heating rate of 10° C./minute and determined as the temperature with the highest melting enthalpy.

With the term glass transition temperature is herein understood the temperature measured according to ASTM E 1356-91 by DSC with a heating rate of 20° C./minute and determined as the temperature at the peak of the first derivative (with respect of time) of the parent thermal curve corresponding with the inflection point of the parent thermal curve.

With welding processes according to the state of the art involving polyamide parts, the best welding results are obtained with PA6 and low glass content. The effect of the invention is that better results can also be obtained with other polamides having higher Tg or Tm, and better results can also be obtained with higher glass contents.

The effect thereof is that better welding results can be obtained for products having a higher heat distortion temperature (HDT), thereby extending the temperature range at which the welded plastic bodies can be used.

Preferably, the polymer composition has a HDT, measured according ISO 75/A, of at least 200° C., 230° C., 250° C., 260° C., or even at least 270° C.

Preferably, the polyamide polymer comprises a PA-6,6, PA-4,6 and/or a semi-crystalline semi-aromatic polyamide terephthalate, and/or any copolymer thereof.

Suitably, the polyamide composition comprises a blend of at least two polyamides comprising a first and a second polymide. In a preferred embodiment of the process according to the invention, the polyamide polymer is a blend of a semicrystalline polyamide having a melting point of at least 260° C. and a second polyamide having a melting temperature less than 260° C., or, where the second polyamide is an amorphous polyamide, having a glass transition temperature less than 260° C. Preferably, the first polyamide is PA-6,6, PA-4,6 and/or a semi-crystalline semi-aromatic polyamide terephthalate, and/or any copolymer thereof, whereas the second polyamide is PA-6 or a copolyamide thereof.

Also suitably, the two parts in the process according to the invention and the welded plastic body obtained thereby consist of different polyamide compositions. These different polyamide compositions may differ in that the polyamide polymers comprised by each of the two compositions are different.

Suitably, the polyamide polymer of one part (part L) has a lower softening temperature than the polyamide of the other part (part H), wherein the polyamide composition of part L comprises a high molecular weight polyamide and/or viscosity increasing additives.

The polyamide composition, or compositions, may comprise, next to the polyamide polymer and the iron containing additive, one or more additives.

Such additives suitably include fillers, reinforcing fibers and other additives, known to a person skilled in the art that are customarily used in polyamide compositions used for applications welding process steps, providing they do not essentially detract from the invention. Suitable other additives that may be comprised by the polyamide composition are, for example, thermoplastic polymers different from polyamides, impact modifiers (such rubbers and elastomers), compatibilizers, pigments, flame retardants, stabilizers (for example UV-absorbers, anti-oxidants, and heat stabilizers), processing agents (mould release agents, nucleating agents), and inorganic salts, acidifying components and mixtures thereof. Examples of suitable inorganic salts include alkali, alkaline earth and transition metal halides, sulphates, nitrates, carbonates, carboxylates, sulphites and phosphates, such as sodium chloride, potassium bromide, potassium iodide, calcium carbonate, magnesium sulphate, cupric nitrate, cupric iodide, cupric acetate and mixtures thereof. Suitable acidifying component are, for example, phosphor buffers, such as pyrophosphates, a suitable example of which is sodium pyrophosphate ($Na_2H_2PO_7$).

Suitable rubbers that can be used as impact modifier are for example, SBS rubber and EPDM rubber.

Thermoplastic polymers that can be used in the polyamide compositions next to the polyamide polymer, may be any type of thermoplastic polymer suitable for use in moulding compositions for applications involving welding processing steps. The thermoplastic polymer can be, for example, an amorphous polymer or a semi-crystalline polymer. Suitable amorphous polymers are, for example, polyimides (PI) polyethersulfones (PES), polyetherimides (PEI), polysulfones (PSU), and polyarylates (PAR) amorphous polyesters (PES). Suitable semi-crystalline polymers are, for example, polyetheretherketones (PEEK), polyphenylesulfides (PPS), and semi-aromatic thermoplastic polyesters. The thermoplastic polymer, may also be a polyolefine, such as polyethylene (PE), polypropylene (PP), and PE/PP copolymers. The thermoplastic polymer may also comprise a blend of different thermoplastic polymers.

The thermoplastic polymer, if used at all, is preferably present in an amount of 0.1-20 mass %, more preferably 0.5-10 mass %, and most preferably 1-5 mass %, relative to the weight of the polyamide polymer.

A compatibilizer is advantageously used in combination with thermoplastic polymers and impact modifiers having low compatibility with the thermoplastic polymer.

Suitable pigments include black pigments, such as carbon black and nigrosine, and white pigments, such as $TiO_2$ and ZnS.

Suitable heat stabilizer are, for example, phenolic thermo-stabilizers (e.g Irganox 1098), phosphates (e.g. Irgafos 168), aromatic amines and metal salts. Examples of suitable metal salts are for example, nickel dithiocarbamates (like Hostavin VPNiCS1), zinc dithiocarbamates (like hostanox VPZnCS1) and copper salts (like CuI/KI).

In particular, the polyamide composition preferably comprises a filler and/or refinforcing fibres.

Fillers are herein understood to be particle shaped materials. The particles of the fillers may have a variety of structures, for example, flake, plate, rice, hexagonal, or spherical-like shapes. The filler can be any filler known to the person skilled in the art of making polyamide moulding compounds. Suitably, the filler comprised in the polyamide composition according to the invention has an aspect ratio L/D<5. Also suitably the filler is an inorganic filler, which includes, for example, glass beads, inorganic fillers like bariumsulfate and aluminium silicates, and mineral fillers, such as talcum, calcium carbonate, kaolin, wollastonite, mica, clay and calcined clay. The filler may optionally be surface treated for better compatibility with the thermoplastic polyamide.

The fibrous reinforcing agent that be comprised by the polyamide parts used in the process according to the invention, and by at least one part in the welded plastic body obtainable by said process, may be any type of fibrous reinforcing agent suitable for use in fibre reinforced thermoplastic welded plastic bodies. A fibrous reinforcing agent is considered herein to be a material having length, width and thickness, wherein the average length is significantly larger than both the width and thickness. Generally, such a material has an aspect ratio L/D, defined as the average ratio between the length (L) and the largest of the width and thickness (D) of at least 5. Preferably, the aspect ratio of the fibrous reinforcing agent is at least 10, more preferably at least 20, still more preferably at least 50.

Suitable fibrous reinforcing agents are, for example, non-metallic fibrous reinforcing agents such as glass fibres, carbon or graphite fibres, aramide fibres, ceramic fibres, mineral fibres, such as wollastonite, and whiskers, and metallic fibres such as copper, iron and aluminium fibres are not preferred in the process and composition according to the invention in view of the application field envisaged for the composition.

The amount of filler and fibrous reinforcing agent that is comprised by the polyamide parts used in the process according to the invention can be varied over a large range. Generally that amount ranges from 0 to 300 parts by weight (pbw) relative to 100 pbw polyamide polymer. Preferably, the amount is 5-235 pbw, more preferably 10-150 pbw, still more preferably 25-100 pbw, relative to 100 pbw polyamide polymer.

Suitably, the polyamide composition comprises at least one additive chosen from the group of a stabilizer comprising a copper salt, fillers (for example, mineral fillers), fibrous reinforcing agents, alkali halides (such as NaCl) and pyro-phosphates (such as sodium pyrophosphate or $Na_2H_2PO_7$). The advantage of each of these is that the weld strength is further enhanced.

Preferably, the polyamide composition comprises a combination of a copper salt, such as CuI, and/or a alkali halide, such as KI and/or NaCl, and/or sodium pyrophosphate.

The combination of the copper salt, the alkali halide, and/or the sodium pyrophosphate is preferably present in a total amount of 0.001-10 wt. %, more preferably 0.01-5 wt. %, still more preferably 0.01-3 wt. %, relative to the total weight of the polyamide composition.

Preferably, the fillers and/or fibrous reinforcing agents are present in a total amount of 1-70 wt. %, more preferably 10-50 wt. %, relative to the total weight of the polyamide composition.

In a preferred embodiment of the invention, at least one part consists of a polyamide composition comprising
   30-95 wt. % pbw polyamide polymer,
   0.01-10 wt % iron containing additive
   0-70 wt % fillers and/or fibrous reinforcing agents,
   0.01-5 wt. % of at least one additive chosen from copper salts, alkali halides and pyrophosphates, and
   0-20 wt. % further additives.

In a more preferred embodiment, the polyamide composition consists of
   30-90 wt. % pbw polyamide polymer,
   0.05-5 wt % iron containing additive
   5-70 wt % fillers and/or fibrous reinforcing agents,
   0.1-3 wt. % of at least one additive chosen from copper salts, alkali halides and pyrophosphates, and
   0-10 wt. % further additives.

Herein the weight percentages (wt. %) are relative to the total weight of the polyamide composition.

The polyamide parts used in the process according to the invention can be made by any process that is suitable for making polyamide parts. Preferably, the polyamide parts are made by an injection moulding process or an extrusion process.

The welding step in the process according to the invention can involve any welding technique suitable for welding polyamide parts. Suitable welding techniques are, for example, contact welding, electromagnetic welding, hot plate welding, high frequency welding, ultrasonic welding, vibration or friction welding, and laser welding. However, laser welding is generally not preferred due to the typical non-transparent nature of the iron containing additive.

Preferably, the welding technique is selected from a group consisting of contact welding, hot plate welding, high frequency welding, ultrasonic welding, vibration or friction welding.

Preferably, the welding is done by, vibration welding or hot plate welding, more preferably vibration welding.

Also the weld joint produced by the process according to the invention and comprised by the welded plastic part according to the invention can be any weld joint obtainable by welding to plastic parts. Suitable the weld joint is a butt joint, a corner joint, a T joint, a lap joint or an edge joint.

The invention also relates to a welded plastic body comprising two polyamide parts welded together. In the welded plastic body according to the invention at least one of the two polyamide parts consists of a polyamide composition comprising an iron containing additive.

The effect of the iron containing additive in the welded plastic body comprising the at least one polyamide part consisting of the said polyamide composition is an enhanced weld strength performance as described above.

The invention relates in particular to welded plastic bodies obtainable by the process according to the invention and any embodiment or preferred embodiment thereof as described above. Preferably, the polyamide composition comprising the iron containing additive in at least one part of the welded plastic body according to the invention, has a composition and/or comprises further components according to any of the preferred embodiments described above for the welding process according to the invention.

The welded plastic body can be any plastic body obtainable with to the process according to the invention. Suitably the process according to the invention is used for the manufacturing of corrugated tubes, bellows, containers, fuel inlet systems, air inlet manifolds, airducts.

The invention furthermore relates to corrugated tubes, bellows, intercooler end caps, containers, fuel inlet systems, air inlet manifolds, airducts manufactured with to the process according to the invention.

The invention is further illustrated with the following examples and comparative experiments.

Materials Used

PA-6 Polyamide 6, type K122, viscosity number 115 ml/g (measured according to ISO 307) (ex DSM, The Netherlands)

PA-4,6 Polyamide-4,6, type KS 200, viscosity number 160 ml/g (measured according to ISO 307), (ex DSM, The Netherlands)

GF-I Glass fibre reinforcing agent: standard type glass fibres for use in polyamide-6

GF-II Glass fibre reinforcing agent: standard type glass fibres for use in polyamide-46

AADS Auxilliary additives: combination of standard additives comprising a lubricant annex mould release agent, a CuI/KI stabilizer, a pigment concentrate, a carrier polymer and a compatibilizer ICA Iron containing additive: Masterbatch in PE containing 20 mass % of elementary iron particles, average particle size 30 μm.

PREPARATION OF POLYAMIDE COMPOSITIONS

Comparative Experiment A

PA-6-GF

A 30 wt % glass fibre reinforced PA-6-1-GF was compounded from PA-6 and GF in a double-screw extruder type ZSK 30 at a barrel temperature of 260° C., screw speed 250 rpm.

Comparative Experiment B

PA-4,6-GF

A 30 wt % glass fibre reinforced PA-4,6-GF was compounded from PA-4,6 and GF-II and regular processing aids and stabilisers in a ZSK 25 extruder at a barrel temperature of 300° C., screw speed 275 rpm (throughput 20 Kg/h).

Example I

PA-6/46-GF-ICA-1

A 35 wt % glass fibre reinforced composition of polyamide-6/46, modified with iron containing additive was made by compounding polyamide-6 and polyamide-46 (mass ratio 25/75), glass fibre GF-II, regular processing aids and stabilisers and 2.5 mass % of the master batch of elementary iron, on a ZSK25 twin-screw extruder at the same conditions as Comparative Experiment B.

Example II

PA-6/46-GF-ICA-2

A 40 wt % glass fibre reinforced composition of polyamide-6/46, modified with iron containing additive was made by compounding polyamide-6 and polyamide-46 (mass ratio 50/50), glass fibre GF-II, regular processing aids and stabilisers and 2.5 mass % of the master batch of elementary iron, on a ZSK25 twin-screw extruder at the same conditions as Comparative Experiment B.

Injection Moulding

For all the tested materials, plates of dimensions 120 mm×120 mm×4 mm were injection moulded according to the following conditions Injection Moulding of Polyamide-6 Material Injection moulding of the polyamide-6 material of Comparative Experiment A was performed on a KM 120 injection-moulding machine with barrel temperature settings 230-260° C. and a mould temperature of 80° C.

Injection Moulding of Polyamide-4,6 Materials

Injection moulding of the polyamide-4,6 and polyamide-6/4,6 materials of Examples I-II and Comparative Experiment B was performed on a KM 120 injection-moulding machine with barrel temperature settings 300-310° C. and a mould temperature of 120° C. was used.

Vibration Welding

The welding tests were done on a Bielomatik (Neuffen, Germany) vibration-welding machine, Type K3210. The welding parameters were as follows: frequency: 240 Hz; amplitude: 0.9 mm; weld pressure: 2 Mpa; weld time: 4 s; hold time: 7 s. The process was time controlled to yield an estimated weld depth of 1.8 mm. For each material, 4 weldings were executed.

For the purpose of the welding tests, the injection-moulded parts were cut in half along the 120 mm width. The butt-welded samples were oriented in the tool such that the 120 mm×4 mm molded surface opposite to the cut-line became the weld area. Welding occurred on molded surfaces to adequately represent an industrial welding process. Vibration was parallel to the 120 mm plate width.

Tensile Testing

The butt-welded samples were cut into 10 mm wide tensile specimens and loaded on a Zwick testing machine until fracture at a crosshead speed of 10 mm/min. The tensile strength was obtained by the force at failure normalized by the weld area, being 4 mm×10 mm. The strain was measured with an extensiometer and established as the macroscopic strain at break; the real strain can be much higher in many cases. The values listed are averaged over four specimens.

EXAMPLES AND COMPARATIVE EXPERIMENT

Vibration welding according the above-described method was done for the combinations of materials listed in Table I. Tensile tests were performed on these welded materials according above methods. The test results are reported in Table I.

TABLE I

Compositions and homogeneous welding results of the polyamide compositions of Examples I-II and Comparative Examples A-B.

| Experiment | CE-A | CE-B | EX-I | EX-II |
|---|---|---|---|---|
| Component (in wt. %) | | | | |
| PA-6 | 67 | — | 14 | 27 |
| PA-46 | | 67 | 45.5 | 27.5 |
| GF | 30 | 30 | 35 | 40 |
| AADS | 3 | 3 | 3 | 3 |
| ICA | — | — | 2.5 | 2.5 |
| Test results | | | | |
| Weld strength (MPa) | 72 | 67 | 70 | 77 |
| Weld strength retention After 1000 h at 210° C. | bad ±25% | bad ±25% | good ±55% | good ±55% |

The results show that the weld strength of the compositions according to the invention (Examples I-II) are comparable or even better than those of polyamide-6 despite the facts that a large part of the polyamide polymer in Examples I-II consists of polyamide-4,6, which itself gives less good results than polyamide-6 (see Comparative Experiments A and B), and Examples I-II contain a larger wt. % of glass fibre, which normally has an adverse effect on the weld line properties.

The invention claimed is:

1. A process for welding two polyamide parts comprising forming a welded joint between the two polyamide parts, wherein both polyamide parts consist of a polyamide composition comprising a polyamide polymer and optionally comprising additives, and wherein each of the two parts consists of a polyamide composition comprising an iron containing additive, wherein the iron containing additive is comprised of elementary iron.

2. The process according to claim 1, wherein the iron containing additive has an iron content, relative to the total metal content of the iron containing additive, of at least 75 wt. %.

3. The process according to claim 1, wherein the iron containing additive comprises finely dispersed elementary iron having a weight average particle size of at most 450 µm.

4. The process according to claim 1, wherein the iron containing additive comprises finely dispersed elementary iron having a weight average particle size of more than 1 µm.

5. The process according to claim 1, wherein the iron containing additive comprises iron (II) oxide, iron (III) oxide and/or a combination thereof, a ferrite, and/or an iron phosphorus oxide.

6. The process according to claim 1, wherein the iron containing additive comprises an iron oxide, or salt thereof, having a weight average particle size of at most 1 mm.

7. The process according to claim 1, wherein the iron containing additive is present in an amount of 0.01-10 mass %, relative to the total weight of the polyamide composition.

8. The process according to claim 1, wherein the polyamide composition comprising the iron containing additive comprises an additive chosen from the group consisting of fillers, fibres, stabilizer, processing agents and auxiliary additives.

9. The process according to claim 1, wherein the polyamide composition comprising the iron containing additive comprises a copper salt, and/or an alkali halide, and/or a pyrophosphate.

10. The process according to claim 1, wherein the polyamide composition of both polyamide parts comprises an inorganic filler and/or fibrous reinforcing agent.

11. The process according to claim 1, wherein the welding is done by vibration welding or hot plate welding.

12. The process according to claim 10, wherein the welding is done by vibration welding.

* * * * *